United States Patent
Murray (10) Patent No.: US 12,287,515 B2
(45) Date of Patent: Apr. 29, 2025

(54) LINE-SHAPED HEATER AND AN OPTICAL RESONATOR WITH PORTIONS ON OPPOSITE SIDES OF THE LINE-SHAPED HEATER

(71) Applicant: RANOVUS INC., Kanata (CA)

(72) Inventor: Kyle Murray, Fuerth (DE)

(73) Assignee: RANOVUS INC., Kanata (CA)

( * ) Notice: Subject to any disclaimer, the term of this patent is extended or adjusted under 35 U.S.C. 154(b) by 233 days.

(21) Appl. No.: 18/076,658

(22) Filed: Dec. 7, 2022

(65) Prior Publication Data

US 2023/0213704 A1 Jul. 6, 2023

Related U.S. Application Data

(60) Provisional application No. 63/295,697, filed on Dec. 31, 2021.

(51) Int. Cl.
G02B 6/293 (2006.01)

(52) U.S. Cl.
CPC ..... *G02B 6/29395* (2013.01); *G02B 6/29338* (2013.01)

(58) Field of Classification Search
CPC ............ G02B 6/29338; G02B 6/29341; G02B 6/29343; G02B 6/29347
See application file for complete search history.

(56) References Cited

U.S. PATENT DOCUMENTS

| | | | | |
|---|---|---|---|---|
| 3,589,794 A | * | 6/1971 | Marcatili | G02B 6/29338 385/39 |
| 6,636,668 B1 | * | 10/2003 | Al-hemyari | G02B 6/12007 385/32 |
| 7,616,850 B1 | * | 11/2009 | Watts | G02B 6/29335 385/32 |
| 11,796,841 B1 | * | 10/2023 | Martinez | G02F 1/025 |
| 2014/0110572 A1 | * | 4/2014 | Li | G02F 1/025 250/227.23 |

(Continued)

FOREIGN PATENT DOCUMENTS

| JP | 2010027664 A | 2/2010 |
|---|---|---|
| JP | 2017161591 A | 9/2017 |

OTHER PUBLICATIONS

Extended European search report for application 22217127.4, dated May 12, 2023. (Year: 2023).*

(Continued)

*Primary Examiner* — Michael Stahl
(74) *Attorney, Agent, or Firm* — PERRY + CURRIER INC.

(57) ABSTRACT

A line-shaped heater and an optical resonator with portions on opposite sides of the line-shaped heater are provided. In particular a device provided herein includes: one or more inputs; one or more outputs; one or more optical waveguides configured to: receive an optical signal from at least one of the one or more inputs; and convey the optical signal to at least one of the one or more outputs; an optical resonator configured to modulate or filter the optical signal; and a heater configured to heat the optical resonator, the heater being line-shaped and having a first side and a second side opposite the first side, and the optical resonator comprising a first portion at the first side of the heater and a second portion at the second side of the heater.

11 Claims, 8 Drawing Sheets

(56) References Cited

U.S. PATENT DOCUMENTS

| | | | |
|---|---|---|---|
| 2014/0376851 A1* | 12/2014 | Akiyama | G02F 1/025 |
| | | | 385/2 |
| 2017/0276873 A1* | 9/2017 | Hu | G02B 6/29397 |
| 2020/0280173 A1 | 9/2020 | Gao et al. | |
| 2022/0107542 A1* | 4/2022 | Parker | G02F 1/025 |
| 2023/0096775 A1* | 3/2023 | Nedovic | G02F 1/0147 |
| | | | 385/40 |
| 2023/0118909 A1* | 4/2023 | Seyedi | G02F 1/025 |
| | | | 385/14 |

OTHER PUBLICATIONS

Tissier, Pierre, et al. "Backside cavities for thermal tuning optimization of silicon ring resonators." 2021 IEEE 71st Electronic Components and Technology Conference (ECTC). IEEE, 2021.

* cited by examiner

Prior Art

LINE-SHAPED HEATER AND AN OPTICAL RESONATOR WITH PORTIONS ON OPPOSITE SIDES OF THE LINE-SHAPED HEATER

BACKGROUND

Optical resonators implemented on silicon-on-insulator often need to have their resonance frequency thermally tuned to a desired frequency. However, present optical resonators and heaters are generally ring shaped, with a ring-shaped heater being inside or outside an optical resonator. As such, heat from the heater that is radiated on a side opposite the optical resonator is generally wasted as the heat is not directed towards the optical resonator.

BRIEF DESCRIPTION OF THE DRAWINGS

For a better understanding of the various examples described herein and to show more clearly how they may be carried into effect, reference will now be made, by way of example only, to the accompanying drawings in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Optical resonators implemented on silicon-on-insulator often need to have their resonance frequency thermally tuned to a desired frequency. However, present optical resonators and heaters are generally ring shaped, with a ring-shaped heater being inside or outside an optical resonator. As such, heat from the heater that is radiated on a side opposite the optical resonator is generally wasted as the heat is not directed towards the optical resonator.

Hence, provided herein is a device which includes an optical resonator and heater that is line-shaped and having a first side, and a second side opposite the first side. In particular, the heater does not form a ring and/or a circle, and the like, such that the optical resonator is shaped to include a first portion at the first side of the heater and a second portion at the second side of the heater. The heater may be any suitable line-shape and may be straight, curved, wavy, and the like, as long as the heater does not enclose a space and the optical resonator may be shaped to have portions on both sides of the heater.

In particular, the present specification provides a device comprising: one or more inputs; one or more outputs; one or more optical waveguides configured to: receive an optical signal from at least one of the one or more inputs; and convey the optical signal to at least one of the one or more outputs; an optical resonator configured to modulate or filter the optical signal; and a heater configured to heat the optical resonator, the heater being line-shaped and having a first side and a second side opposite the first side, and the optical resonator comprising a first portion at the first side of the heater and a second portion at the second side of the heater.

Figure 1:
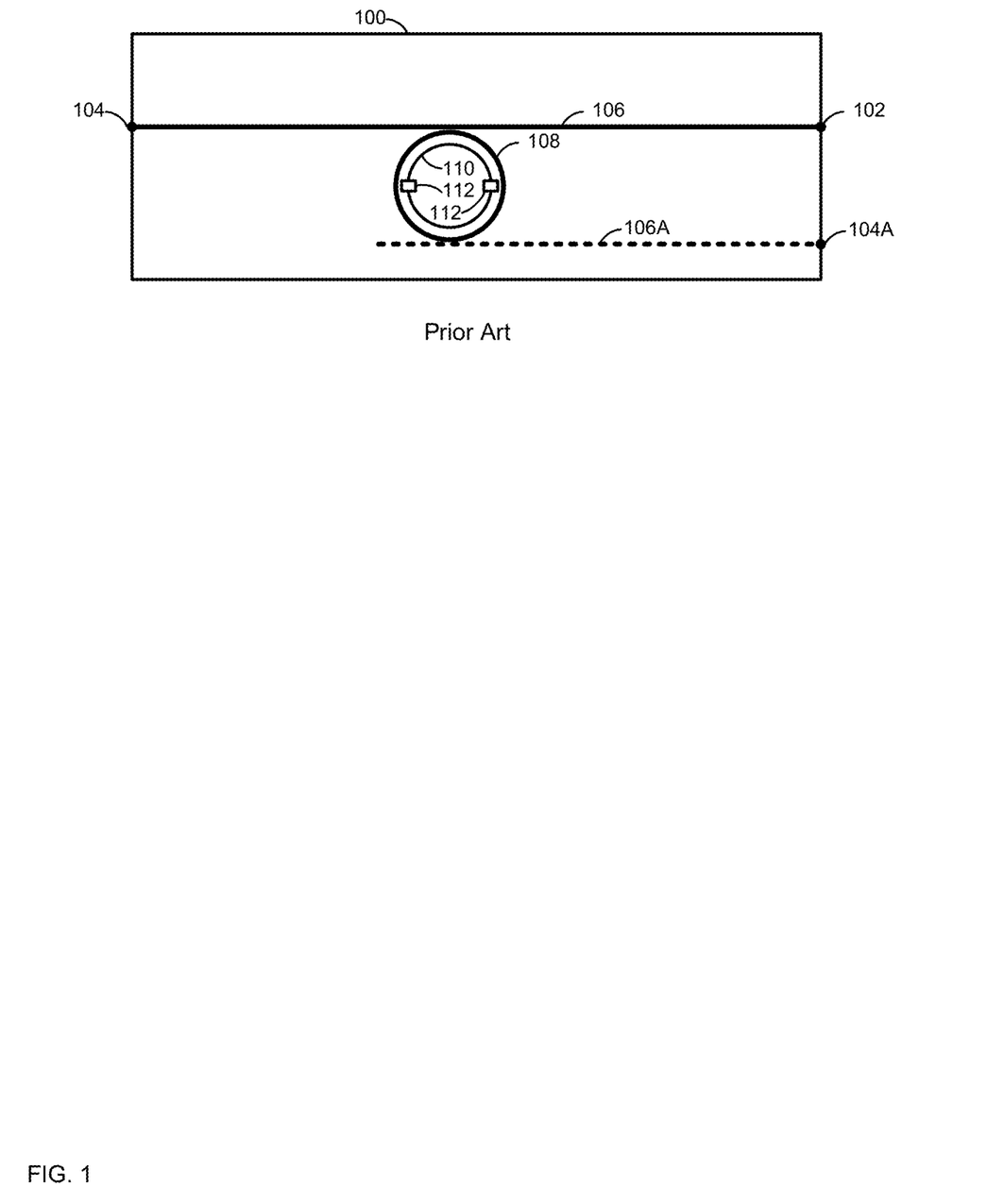
FIG. 1 depicts an example device according to the prior art.

FIG. 1 depicts a device 100 according to the prior art comprising: an input 102; an output 104 (or alternatively an output 104A); one or more optical waveguides 106, 106A configured to: receive an optical signal at the input 102; and convey the optical signal to the output 104 (or the output 104A); an optical resonator 108 configured to modulate or filter the optical signal; and a heater 110 configured to heat the optical resonator 108. As depicted, both the optical resonator 108 and the heater 110 are ring-shaped and hence each form an enclosed space. The device 100 may further comprise a silicon-on-insulator (SOI) device with, for example, the optical waveguides 106 and the optical resonator 108 formed from silicon, and the heater 110 and electrodes 112 thereof formed from conducting and/or resistive materials, such as aluminum. However, any suitable materials are within the scope of the present specification.

As depicted, the heater 110 comprises a pair of the electrodes 112 which may be electrically connected to a power supply to provide a current to the heater 110. While the electrodes 112 are depicted as being on opposite sides of the heater 110, and electrically connected via two arcs (e.g. arc-shaped resistor portions) of the ring, the electrodes 112 may be in any suitable position.

While not depicted, it is understood that the device 100 may include any other suitable components including, but not limited to, a laser that inputs an optical signal to the input 102 (and/or another input), power monitors, a voltage control device of the optical resonator 108 (e.g. that controls modulation of the optical signal by the optical resonator 108), attenuators, feedback components, a controller, and the like.

Furthermore, as depicted, the device 100 includes the optical waveguide 106 between the input 102 and the output 104, with the optical resonator 108 modulating an optical signal received at the input 102, for example as provided by a laser, and emitted at the output 104. Alternatively, the optical resonator 108 may modulate the optical signal received at the input 102 by conveying a portion of the optical signal from the first optical waveguide 106 to the second optical waveguide 106A, where the optical signal is emitted at the second output 104A. Alternatively, while not depicted, the device 100 may comprise more than one input at which an optical signal may be received and conveyed to at least one of the outputs 104, 104A (e.g. being modulated, or filtered, by the optical resonator 108).

Furthermore, while the heater 110 is drawn in a same plane as the optical resonator 108, the heater 110 may be "under" or "over" the optical resonator 108 (e.g. in a different plane from the optical resonator 108).

Furthermore, while not depicted for simplicity, when the optical resonator 108 modulates optical signals (e.g. between the input 102 and the output 104), the optical resonator 108 may be generally understood to include a voltage control device which may be used to control a voltage across at least a portion of the optical resonator 108, which shifts a modulating wavelength (e.g. and/or a resonance frequency and/or the resonance peaks of the optical transfer function) of the optical resonator 108. By controlling the voltage across the optical resonator 108 to shift and unshift the modulating wavelength and/or the resonance frequency, the optical signal on the optical waveguide 106 is modulated and hence data may be encoded into the optical signal. However, in other examples, the optical resonator 108 may filter an optical signal, for example conveying a particular frequency of the optical signal from the first optical waveguide 106 to the second optical waveguide 106A; in these examples, the optical signal may not be modulated and the device 100 may not include a voltage control device.

Regardless of modulating or filtering, the optical resonator 108 is generally controlled to about align a modulating wavelength (e.g. a region of a resonance peak of the optical transfer function) with a wavelength (e.g. a laser wavelength) of the optical signal. In particular, a modulating wavelength and/or a resonance frequency of the optical resonator 108 is sensitive to heat. Hence, to control the modulating wavelength and/or a resonance frequency of the optical resonator 108, the device 100 comprises the heater 110 configured to heat the optical resonator 108. In general, the heater 110 is controlled to align a region of a resonance peak of an optical transfer function of the optical resonator 108 with the wavelength of the optical signal.

Hence, the heater 110 may be used to control the optical resonator 108 to a temperature at which the optical resonator 108 modulates or filters wavelengths that are about the same as a wavelength of the optical signal received at the input 102. When the voltage control device is present, the voltage control device may then be used to modulate and/or change the modulating wavelength to modulate the optical signal on the optical waveguide 106. Alternatively, the voltage control device may be used to control the optical resonator 108 to convey a portion of the optical signal from the first optical waveguide 106 to the second optical waveguide 106A; however in these examples such control may occur via the heater 110 (e.g. to tune the optical resonator 108 to a resonating frequency that is conveyed from the first optical waveguide 106 to the second optical waveguide 106A).

While as depicted, the heater 110 is located inside the optical resonator 108, in other examples the heater 110 may be located outside the optical resonator 108 (e.g. with the optical resonator 108 located inside the heater 110). Regardless, heat emitted from the heater 110 on a side opposite the optical resonator 108 is directed away from the optical resonator 108 and hence is wasted and/or does not contribute to heating of the optical resonator 108. As such heating is important to control of the device 100, and the optical resonator 108 in particular, such wasted heat generally contributes to inefficient use of power at the device 100.

Figure 2:
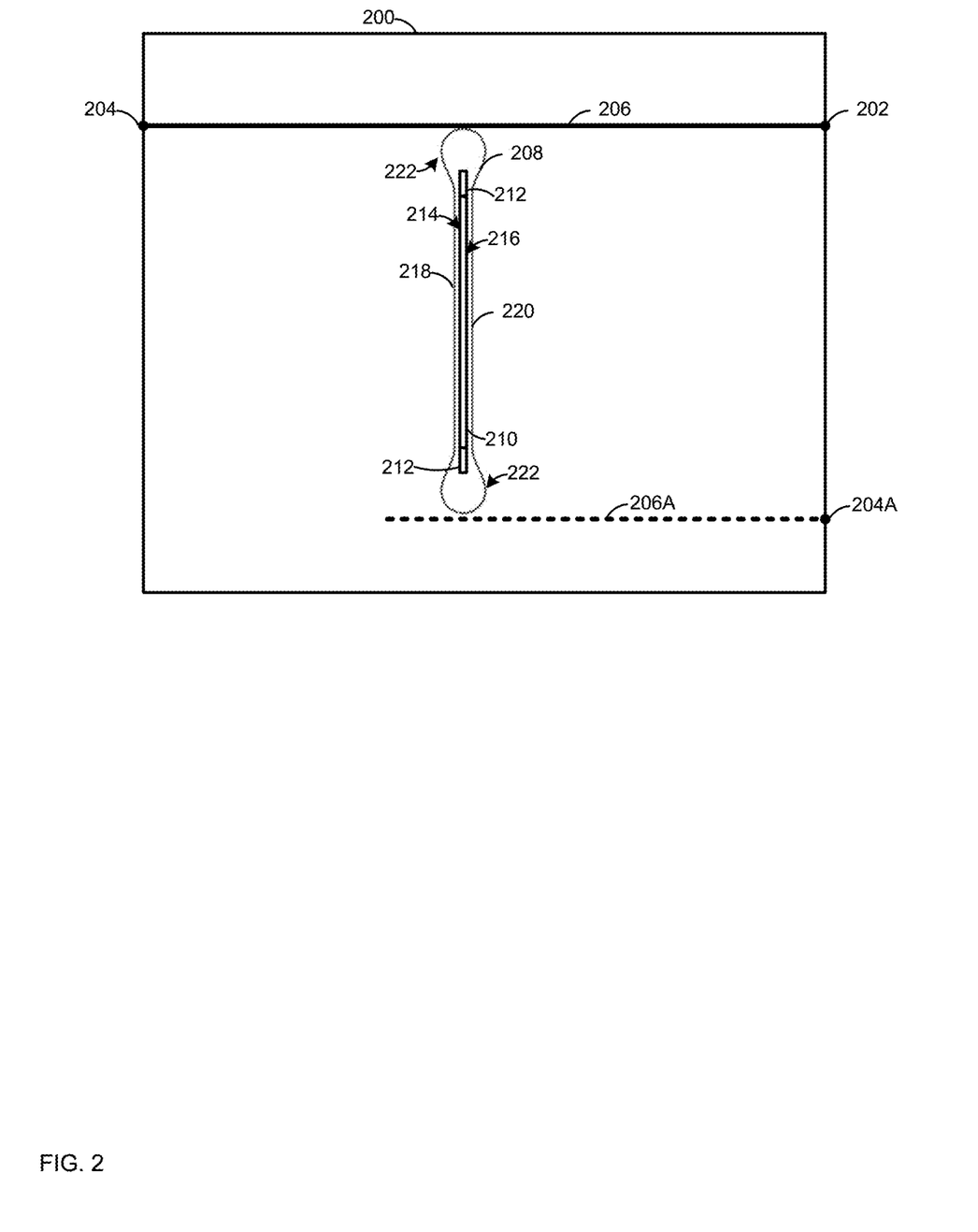
FIG. 2 depicts an example device that includes a line-shaped heater and an optical resonator with portions on opposite sides of the line-shaped heater, according to non-limiting examples.

Hence, attention is next directed to FIG. 2 which depicts a device 200 that is similar to the device 100, however the ring-shaped heater 110 and optical resonator 108 have been replaced with a line-shaped heater and an optical resonator with portions on both of opposite sides of the line-shaped heater.

In particular, the device 200 comprises: one or more inputs 202 (though only one input 202 is depicted); one or more outputs 204, 204A; and one or more optical waveguides 206, 206A configured to: receive an optical signal from at least one of the one or more inputs 202; and convey the optical signal to at least one of the one more outputs 204, 204A. The input 202, the outputs 204, 204A and the one or more optical waveguides 206, 206A are respectively similar to the input 102, the outputs 104, 104A and the one or more optical waveguides 106, 106A. The device 200 may comprise an SOI device, though any suitable materials are within the scope of the present specification.

However, the device 200 further comprises an optical resonator 208 configured to modulate or filter the optical signal (e.g. received at the input 202, or another input); and a heater 210 configured to heat the optical resonator 208, the heater 210 being line-shaped (and including electrodes 212 at opposite ends of the line-shaped heater 210), the heater 210 having a first side 214 and a second side 216, opposite the first side 214, and the optical resonator 208 comprising a first portion 218 at the first side 214 of the heater 210 and a second portion 220 at the second side 216 of the heater 210.

In particular, as the heater 210 is line-shaped (e.g. and not ring shaped as is the heater 110), the heater 210 does not enclose a space, which generally enables the optical resonator 208 to be shaped such that portions 218, 220 of the optical resonator 208 may be located on opposite sides 214, 216 of the heater 210.

As depicted, the heater 210 is located inside an enclosed space formed by the optical resonator 208, such that respective interior sides of the first portion 218 and the second portion 220 are facing the heater 210. As such, heat emitted by the heater 210 at both of the opposite sides 214, 216 are used to heat the optical resonator 208. Hence, heating of optical resonator 208 by the heater 210 may be more efficient than heating of the optical resonator 208 by the heater 110 of the device 100.

As depicted, the first portion 218 and the second portion 220 of the optical resonator 208 are adjacent the heater 210 (e.g. the first portion 218 of the optical resonator 208 is adjacent the first side 214 of the heater 210, and the second portion 220 of the optical resonator 208 is adjacent the second side 216 of the heater 210). Furthermore, the optical resonator 208 further comprises opposite ends 222 that join the first portion 218 and the second portion 220, the opposite ends 222 being rounded, and the opposite ends 222 being wider than a distance between the first portion 218 and the second portion 220. In particular, as the heater 210 is in a straight line (e.g. a resistor portion of the heater 210 is in a straight line), and as the first portion 218 and the second portion 220 generally "follow" and/or are a same shape as the heater 210, the first portion 218 and the second portion 220 are also straight lines and are positioned as close to the heater 210 as possible without interfering with the performance of the optical resonator 208 (e.g. minimizing and/or eliminating optical loss which may be introduced when the portions 218, 220 are too close to the heater 210), which may be determined heuristically. Put another way, the heater 210 is understood to be in a straight line, and has a given width, and the portions 218, 220 of the optical resonator 208 that join the opposite ends 222, are adjacent the heater 210 and may be separated by a distance that is greater than the width of the heater 210, for example when the heater 210 and the optical resonator 208 are in a same plane. However, when the heater 210 and the optical resonator 208 are not in the same plane, the portions 218, 220 may be above or below respective sides 214, 216 of the heater 210, and a distance between the portions 218, 220 may be about a same as a respective distance between the sides 214, 216.

It is furthermore understood that bend radii of the optical resonator 208 are configured to be as large as possible, to minimize leakage of the optical signal from the optical resonator 208. For example, regions where the optical resonator 208 widens from the portions 218, 220 to a respective end 222 may be curved and not squared off, and the like, and a bend radius of such regions may be selected to minimize leakage of the optical signal from the optical resonator 208.

While as depicted the ends 222 of the optical resonator 208 are adjacent respective optical waveguides 206, 206A, it is understood that any suitable portion of the optical resonator 208 may be adjacent an optical waveguide 206, 206A (e.g. to modulate the optical signal received at the input 202) including, but not limited to, one (or more) of the portions 218, 220.

It is further understood that, like the device 100, the device 200 may include any other suitable components including, but not limited to, a laser that inputs an optical signal to the input 202 (and/or another input), power monitors, a voltage control device of the optical resonator 208 (e.g. that controls modulation of the optical signal by the optical resonator 208), attenuators, feedback components, a controller, and the like.

However, other configurations for optical resonators and linear-shaped heaters are within the scope of the present specification.

Figure 3:
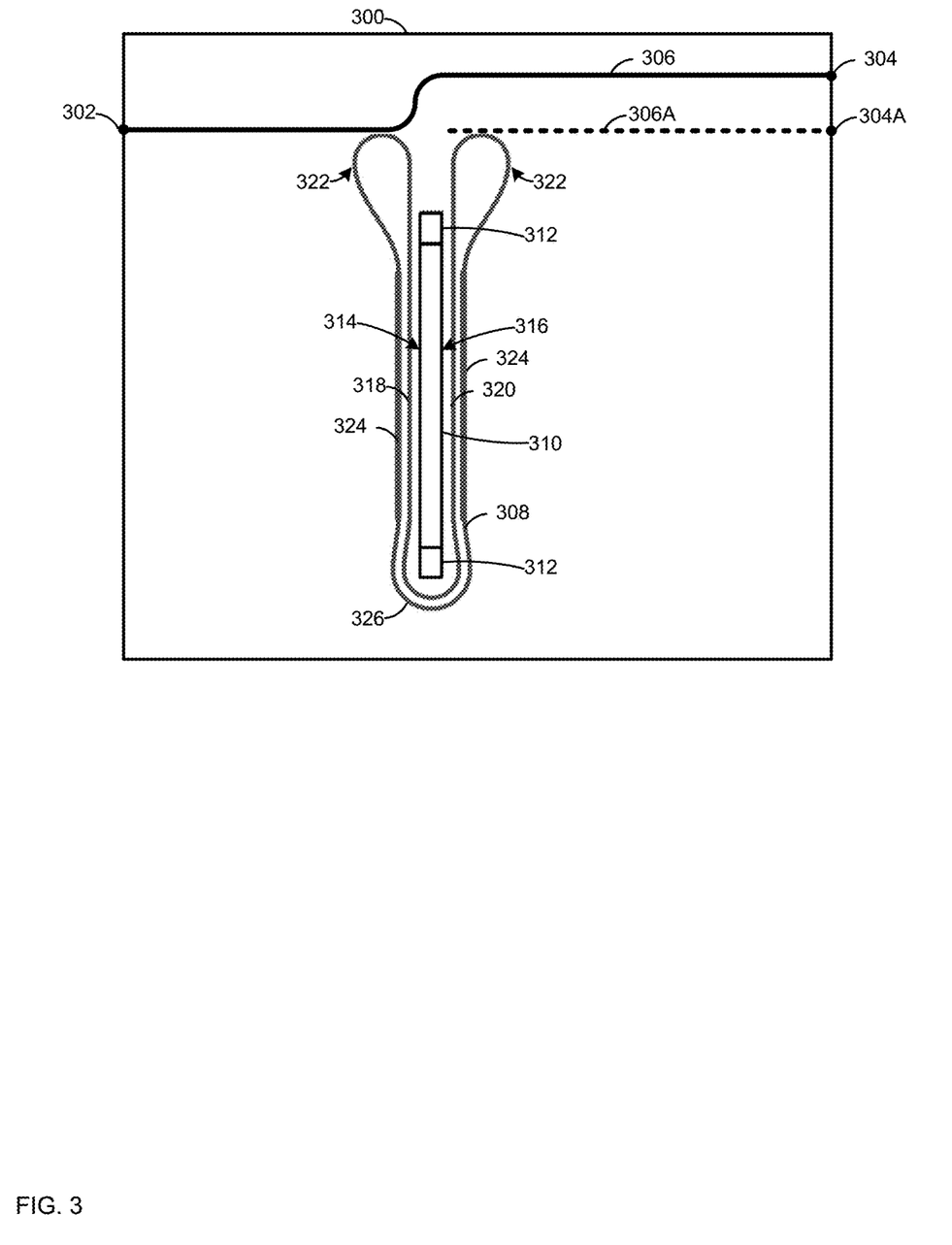
FIG. 3 depicts another example device that includes a line-shaped heater and an optical resonator with portions on opposite sides of the line-shaped heater, according to non-limiting examples.

For example, attention is next directed to FIG. 3 which depicts a device 300 that is similar to the device 100, however the ring-shaped heater 110 and optical resonator 108 have been replaced with a line-shaped heater and an optical resonator with portions on both of opposite sides of the line-shaped heater.

In particular, the device 300 comprises: one or more inputs 302 (e.g. as depicted, one input 302); one or more outputs 304, 304A; and one or more optical waveguides 306, 306A configured to: receive an optical signal from at least one of the one or more inputs 302; and convey the optical signal to at least one of the one or more outputs 304, 304A. The input 302, the outputs 304, 304A and the one or more optical waveguides 306, 306A are respectively similar to the input 102, the outputs 104, 104A and the one or more optical waveguides 106, 106A.

However, the device 300 further comprises an optical resonator 308 configured to modulate or filter the optical signal (e.g. received at the input 302, or another input); and a heater 310 configured to heat the optical resonator 308, the heater 310 being line-shaped (and including electrodes 312 at opposite ends of the line-shaped heater 310, the heater 310 having a first side 314 and a second side 316, opposite the first side 312, and the optical resonator 308 comprising a first portion 318 at the first side 314 of the heater 310 and a second portion 320 at the second side 316 of the heater 310.

In particular, as the heater 310 is line-shaped (e.g. and not ring shaped as is the heater 110), the heater 310 does not enclose a space, which generally enables the optical resonator 308 to be shaped such that portions 318, 320 of the optical resonator 308 may be located on opposite sides 314, 316 of the heater 310.

As depicted, the heater 310 is located outside an enclosed space formed by the optical resonator 308; rather the first portion 318 and the second portion 320 are around the heater 310, such that respective exterior sides of the first portion 318 and the second portion 320 are facing the heater 310. As such, heat emitted by the heater 310 at both of the opposite sides 314, 316 are used to heat the optical resonator 308. Hence, heating of optical resonator 308 by the heater 310 may be more efficient than heating of optical resonator 308 by the heater 110 of the device 100.

As depicted, the first portion 318 and the second portion 320 of the optical resonator 308 are adjacent the heater 310 (e.g. the first portion 318 of the optical resonator 308 is adjacent the first side 314 of the heater 310, and the second portion 320 of the optical resonator 308 is adjacent the second side 316 of the heater 310). Furthermore, the optical resonator 308 further comprises opposite ends 322 that join the first portion 318 and the second portion 320, the opposite ends 322 being rounded, and the opposite ends 322 being wider than a distance between the first portion 318 and the second portion 320. In particular, as the heater 310 is in a straight line, and as the first portion 318 and the second portion 320 generally "follow" and/or are a same shape as the heater 310, the first portion 318 and the second portion 320 are also straight lines and are positioned as close to the heater 310 as possible without interfering with the performance of the optical resonator 308 (e.g. minimizing and/or eliminating optical loss which may be introduced when the portions 318, 320 are too close to the heater 310), which may be determined heuristically. Put another way, the heater 310 is understood to be in a straight line, and has a given width, and the portions 318, 320 of the optical resonator 308 that join the opposite ends 322, are adjacent the heater 310 and separated by a distance that is greater than the width of the heater 310, for example when the heater 310 and the optical resonator 308 are in a same plane. However, when the heater 310 and the optical resonator 308 are not in the same plane, the portions 318, 320 may be above or below respective sides 314, 316 of the heater 210, and a distance between the portions 318, 320 may be about a same as a respective distance between the sides 314, 316.

It is furthermore understood that the opposite ends 322 join the first portion 318 and the second portion 320 and that the optical resonator 308 further comprises additional portions 324 extending from the opposite ends 322 that loop back around the first portion 318 and the second portion 320, via a bend 326; the additional portions 324 are understood to be adjacent to the first portion 318 and the second portion 320 at sides of the first portion 318 and the second portion 320 opposite the heater 310.

In particular, the first portion 318 and the second portion 320 and the additional portions 324 form a pocket within which the heater 310 is located, with the bend 326 forming a closed end of such a pocket, and the adjacent opposite ends 322 forming an open end of such a pocket. Put another way, the optical resonator 308 is "folded" on itself so as to create the pockets (e.g. and minimize the distance of the first portion 318 and the second portion 320 to the heater 310).

It is further understood that the additional portions 324 (e.g. similar to the portions 218, 220) generally "follow" and/or are a same shape as the heater 310, and hence the additional portions 324 are also straight lines and are positioned as close to respective the portions 318, 320 as possible within resonator performance constraints (e.g.

minimizing and/or eliminating optical loss and/or cross-talk which may be introduced when the portions 218, 220 are too close to respective additional portions 224), which may be determined heuristically. Indeed, the heater 310 is understood to further heat the additional portions 324 which contributes to overall heating of the optical resonator 308.

As the additional portions 324 are adjacent to respective portions 318, 320, as depicted, the additional portions 324 may be of different widths than the first portion 318 and the second portion 320 (e.g. and the first portion 318 and the second portion 320 may be of same, or different, widths as each other). Such different widths between the additional portions 324, and respective portions 318, 320, generally assist at minimizing optical cross-talk therebetween. While as depicted, the additional portions 324 are wider than a respective adjacent portion 318, 320, one or more of the additional width 324 may be narrower than a respective adjacent portion 318, 320. However, in other examples, the additional portions 324 and the portions 318, 320 may be of a similar width and/or about the same width, and distances therebetween may be selected to minimize optical cross-talk therebetween, while still allowing for the heater 210 to heat the additional portions 324 and the portions 318, 320.

It is furthermore understood that bend radii of the optical resonator 308 are configured to be as large as possible, to minimize leakage of the optical signal from the optical resonator 308. For example, regions where the optical resonator 308 widens from the portions 318, 320 to a respective end 322, and/or to the bend 326 (which is also understood to be wider than the portions 318, 320) may be curved and not squared off, and the like, and a bend radius of such regions may be selected to minimize leakage of the optical signal from the optical resonator 308.

While as depicted the ends 322 of the optical resonator 308 are adjacent respective optical waveguides 306, 306A, it is understood that any suitable portion of the optical resonator 308 may be adjacent an optical waveguide 306, 306A (e.g. to modulate the optical signal received at the input 302).

It is further understood that, like the device 100, the device 300 may include any other suitable components including, but not limited to, a laser that inputs an optical signal to the input 302 (and/or another input), power monitors, a voltage control device of the optical resonator 308 (e.g. that controls modulation of the optical signal by the optical resonator 308), attenuators, feedback components, a controller, and the like.

Furthermore, as depicted, the optical waveguide 306 is shaped (e.g. via a kink) to be adjacent to one of the ends 322 but not the other of the ends 322; similarly, the optical waveguide 306A is shaped to be adjacent to the other of the ends 322.

Other shapes of optical resonators are within the scope of the present specification. For example, attention is next directed to FIG. 4 which depicts a combination of an optical resonator 408 and a linear-shaped heater 410 that may replace the optical resonator 308 and the linear-shaped heater 310 of the device 300. The linear-shaped heater 410 is similar to the heater 310, and include electrodes 412 similar to the electrodes 312, and first and second sides 414, 416 similar to the first and second sides 314, 316. The optical resonator 408 is further similar to the optical resonator 308 and includes first and second portions 418, 420, opposite ends 422, similar to the first and second portions 318, 320, and opposite ends 322.

Figure 4:
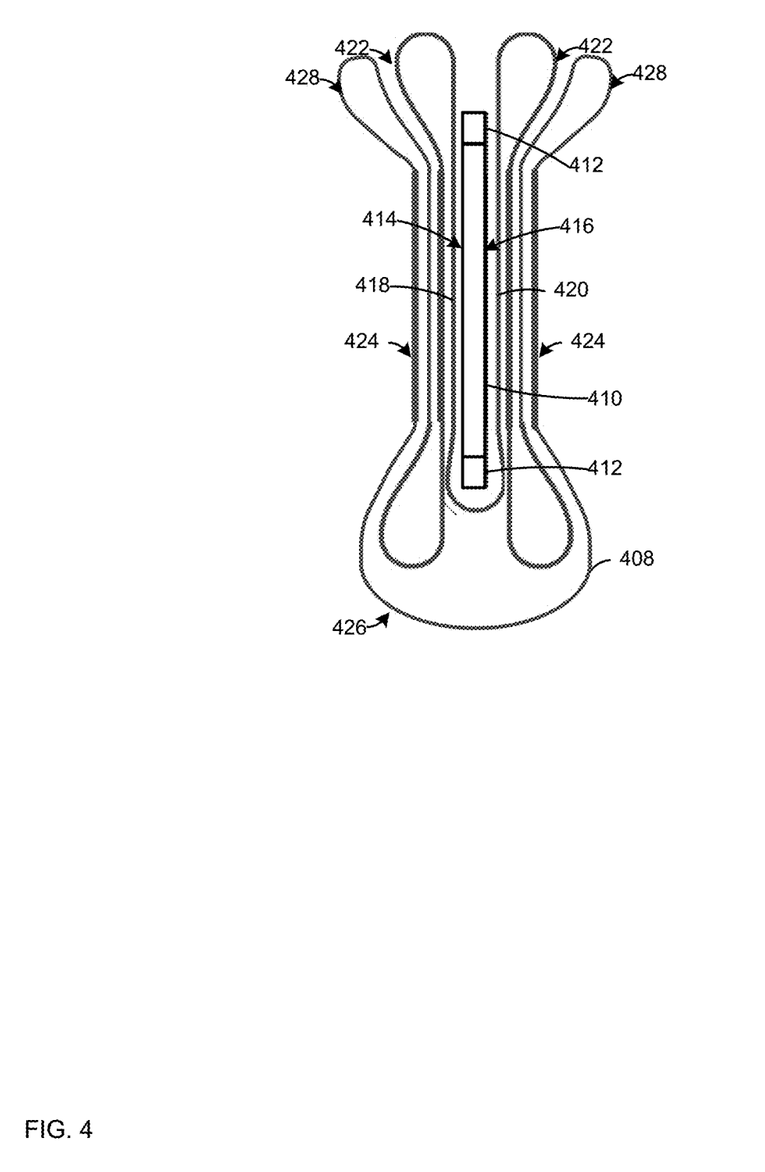
FIG. 4 depicts another example device that includes a line-shaped heater and an optical resonator with portions on opposite sides of the line-shaped heater, according to non-limiting examples.

However, in contrast to the optical resonator 308, the optical resonator 408 includes a plurality of additional portions 424 that extend between the ends 422 and bends 426, as well as between bends 428. Indeed, the bends 426, 428 enable the first portion 418 and the second portion 420, and respective additional portions 424, to loop back around to be adjacent to each other similar to the bend 426. While there are three additional portions 424 per side 414, 416 of the heater 410 (e.g. in addition to a respective portion 418, 420), the optical resonator 408 may comprise any suitable number of additional portions 424 (and bends 426, 428).

Put another way, the portions of the optical resonator 408 may be "folded" multiple times so that such portions passes close by the heater 410 on each side 414, 416 multiple times so that the heat generated is more efficiently utilized (e.g. as compared to the optical resonators 208, 308).

It is further understood that the additional portions 424 (e.g. similar to the portions 418, 420) generally "follow" and/or are a same shape as the heater 410, and hence the additional portions 424 are also straight lines and are positioned as close as possible to respective the portions 418, 420, and/or an adjacent additional portion 424, within resonator performance constraints (e.g. minimizing and/or eliminating optical loss and/or cross-talk which may be introduced when the portions 318, 320 are too close to respective additional portions 324), and which may be determined heuristically. Indeed, the heater 410 is understood to further heat the additional portions 424 which contributes to overall heating of the optical resonator 408.

From FIG. 4 it is further apparent that the first portion 418 and adjacent additional portions 424 are of different widths, and, similarly, the second portion 420 and respective adjacent additional portions 424 are also of different widths. Put another way, portions 418, 420, 424 that are adjacent, and that "follow" respective sides 414, 416 may be of different widths. For example, widths of the portions 418, 420, 424 may alternate between a relatively narrower width and a relatively wider width (or vice versa).

It is further understood that for the optical resonators 208, 308, 408 to all resonate at a similar frequency, the optical resonators 208, 308, 408 are generally of a similar circumferential length. Hence, in some examples, one type of optical resonator (e.g. such as the optical resonator 208) may be used over another optical resonator (e.g. such as the optical resonators 308, 408) when a particular resonance frequency is to be used and a corresponding circumferential length may be difficult to achieve with geometries of some optical resonators (e.g. the looping around of the optical resonator 408 may render the optical resonator 408 too long to achieve some circumferential lengths).

Other shapes of optical resonators and linear-shaped heaters are within the scope of the present specification.

Figure 5:
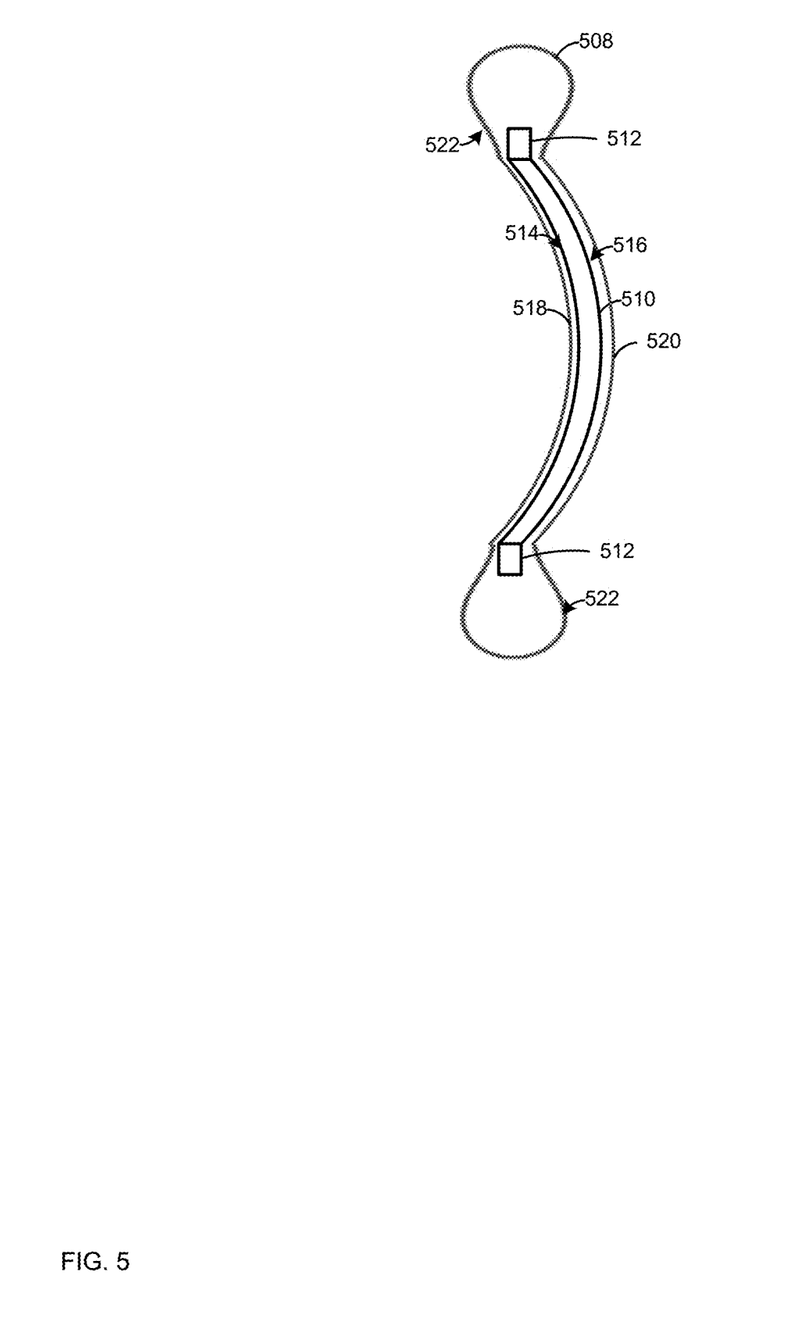
FIG. 5 depicts another example line-shaped heater and an optical resonator with portions on opposite sides of the line-shaped heater, according to non-limiting examples.

For example, attention is next directed to FIG. 5 which depicts a combination of an optical resonator 508 and a linear-shaped heater 510 where the line-shape of the heater 510 is a curved line (e.g. and not a straight line). The heater 510 includes electrodes 512 at opposite ends between which the curved line (e.g. a resistor portion) of the heater 510 extends, and opposite sides 514, 516 (e.g. similar to the first and second sides 214, 216). Similarly, portions 518, 520 of the optical resonator 508 that extend between opposite ends 522 are curved (e.g. complementary, but similar, shapes as respective opposite sides 514, 516) and are adjacent the opposite sides 514, 516 of the heater 510. The portions 518, 520 and the ends 522 are otherwise respectively similar to the portions 218, 220 and the ends 222 of the optical resonator 208.

Figure 6:
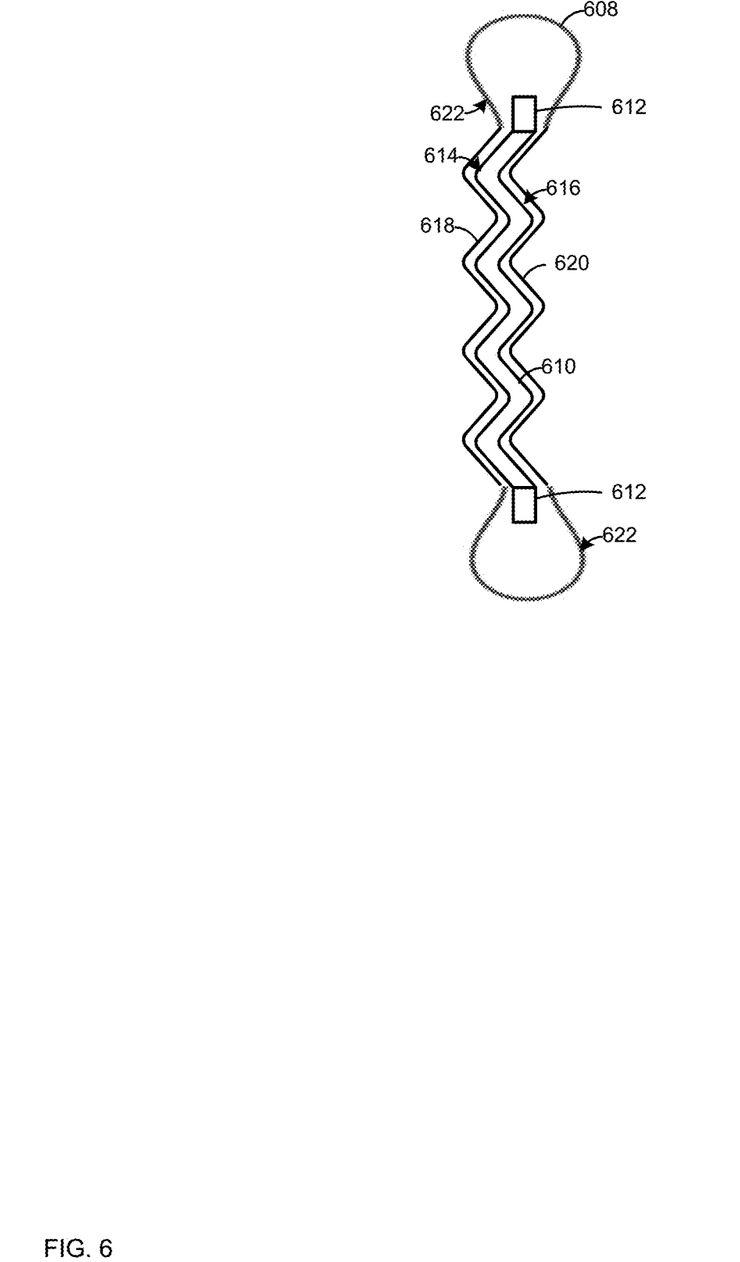
FIG. 6 depicts another example device line-shaped heater and an optical resonator with portions on opposite sides of the line-shaped heater, according to non-limiting examples.

Attention is next directed to FIG. 6 which depicts a combination of an optical resonator 608 and a linear-shaped heater 610 where the line-shape of the heater 610 is a wavy line (e.g. and not a straight line). The heater 610 includes electrodes 612 at opposite ends between which the wavy line (e.g. a resistor portion) of the heater 610 extends, and opposite sides 614, 616 (e.g. similar to the first and second sides 214, 216). Similarly, portions 618, 620 of the optical resonator 608 that extend between opposite ends 622 are wavy (e.g. complementary, but similar, shapes as respective opposite sides 614, 616) and are adjacent the opposite sides 614, 616 of the heater 610. The portions 618, 620 and the ends 622 are otherwise respectively similar to the portions 218, 220 and the ends 222 of the optical resonator 208.

Figure 7:
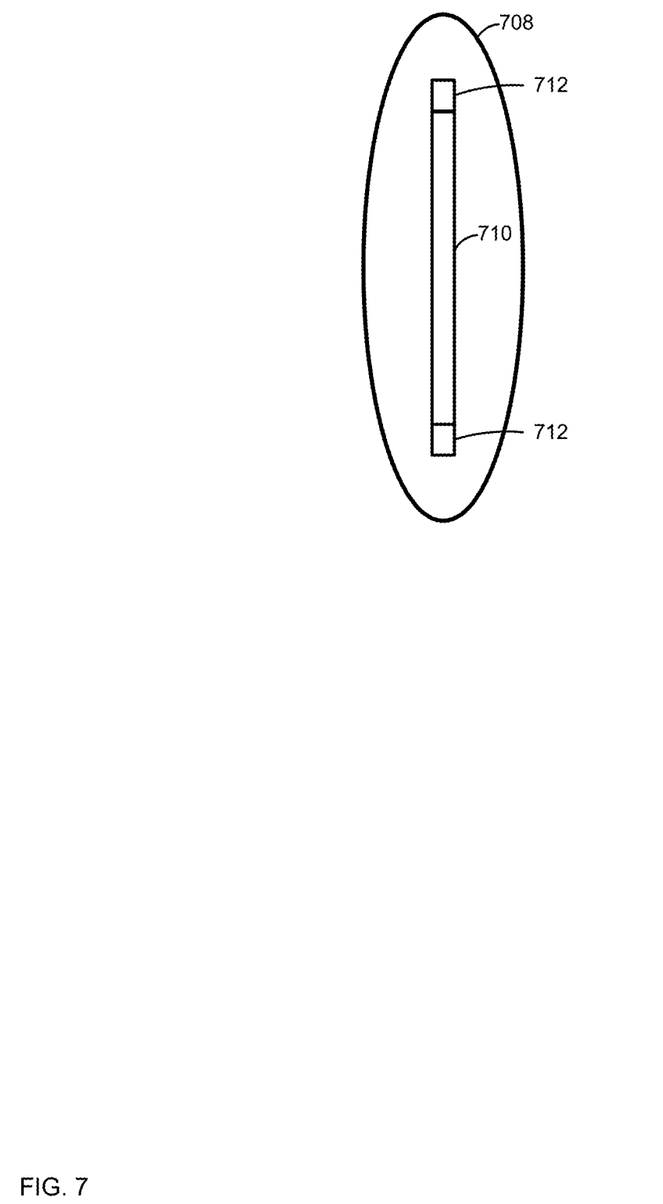
FIG. 7 depicts another example line-shaped heater and an optical resonator with portions on opposite sides of the line-shaped heater, according to non-limiting examples.

Attention is next directed to FIG. 7 which depicts a combination of an optical resonator 708 and a linear-shaped heater 710 (with electrodes 712) where the line-shape of the heater 710 is a straight line, however the optical resonator 708 does not follow the shape of the heater 710. Rather, the heater 710 is inside an enclosed space formed by the elliptically shaped optical resonator 708, and portions of the optical resonator 708 adjacent the heater 710 are not of a same shape as the heater 710. Such an example is understood to be within the scope of the present specification, though such an example may not operate as efficiently as examples where a heater and shapes of portions of an optical resonator (e.g. that are adjacent to the heater) are similar and/or complementary to each other.

Figure 8:
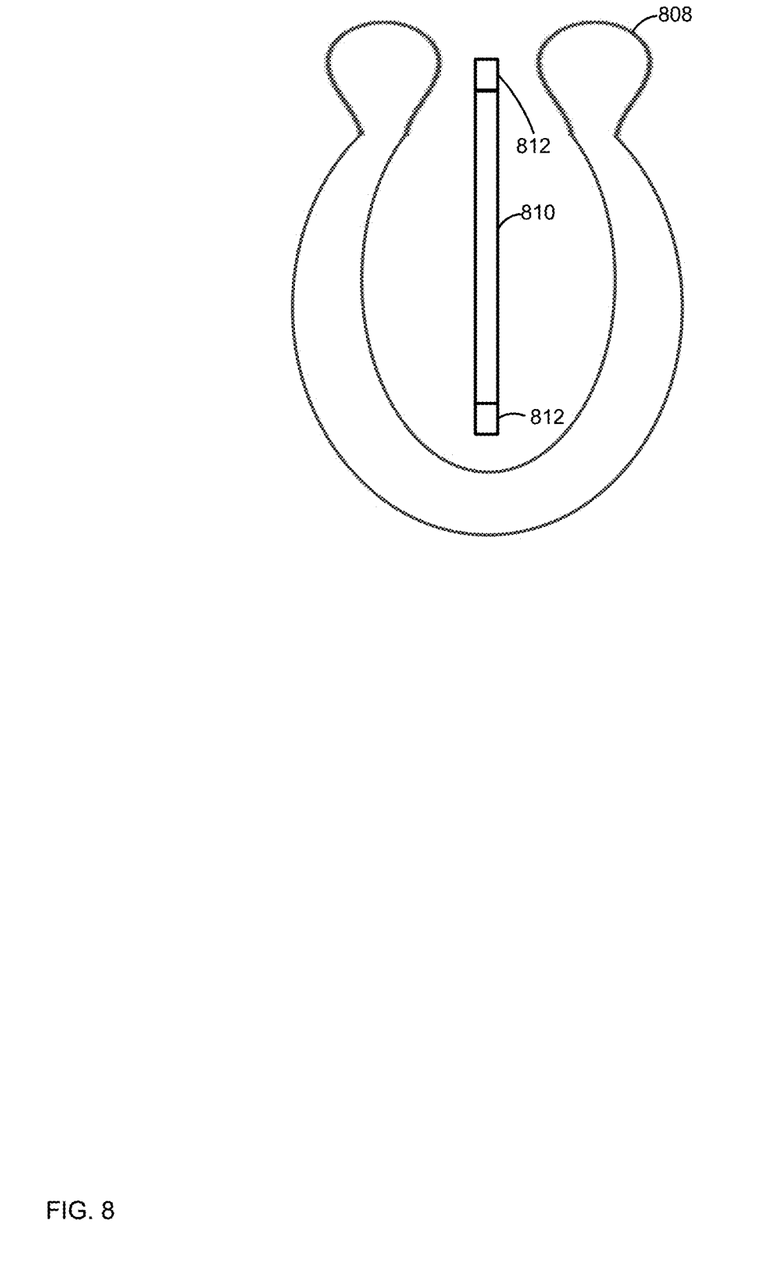
FIG. 8 depicts another example line-shaped heater and an optical resonator with portions on opposite sides of the line-shaped heater, according to non-limiting examples.

Attention is next directed to FIG. 8 which depicts a combination of an optical resonator 808 and a linear-shaped heater 810 (with electrodes 812) where the line-shape of the heater 810 is a straight line, however the optical resonator 808 does not follow the shape of the heater 810. Rather, similar to the optical resonator 308, the optical resonator 808 forms a pocket inside which the heater 810 is located, though portions of the optical resonator 808 adjacent the heater 810 are not of a same shape as the heater 810. Such an example is understood to be within the scope of the present specification, though such an example may not operate as efficiently as example where a heater and shapes of portions of an optical resonator (e.g. that are adjacent to the heater) are similar and/or complementary to each other.

While line-shaped heaters of particular shapes have been described (e.g. straight lines, curved, wavy) have been described, it is understood that line-shaped heaters of any suitable shape are within the scope of the present specification, as long as the shapes do not form an enclosed space.

Furthermore, various examples provided herein may be combined when suitable. For example, the optical resonators of FIG. 3, FIG. 4, FIG. 7 and FIG. 8 may be adapted for line-shaped heaters that are curved, wavy, and the like.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A device comprising:
   one or more inputs; one or more outputs;
   one or more optical waveguides configured to: receive an optical signal from at least one of the one or more inputs; and convey the optical signal to at least one of the one or more outputs;
   an optical resonator configured to modulate or filter the optical signal; and
   a heater configured to heat the optical resonator, the heater being line-shaped and having a first side and a second side opposite the first side, and
   the optical resonator comprising a first portion at the first side of the heater and a second portion at the second side of the heater,
   wherein the first portion and the second portion are adjacent the heater, and the optical resonator further comprises opposite ends that join the first portion and the second portion, the opposite ends being rounded, the opposite ends being wider than a distance between the first portion and the second portion.

2. The device of claim 1, wherein the heater is located inside an enclosed space formed by the optical resonator, such that respective interior sides of the first portion and the second portion are facing the heater.

3. The device of claim 1, wherein the heater is located outside an enclosed space formed by the optical resonator, such that respective exterior sides of the first portion and the second portion are facing the heater.

4. The device of claim 3, further comprising additional portions extending from the opposite ends that loop back around the first portion and the second portion, and are adjacent to the first portion and the second portion at sides of the first portion and the second portion opposite the heater.

5. The device of claim 4, wherein the additional portions are of different widths than the first portion and the second portion.

6. The device of claim 3, further comprising additional portions extending from the opposite ends that loop back around the first portion and the second portion, the first portion and adjacent additional portions being of different widths, and the second portion and respective adjacent additional portions being of different widths.

7. The device of claim 1, wherein the heater is in a straight line.

8. The device of claim 1, wherein the heater is in a curved line.

9. The device of claim 1, wherein the heater is in a wavy line.

10. The device of claim 1, wherein the heater does not enclose a space.

11. The device of claim 1, wherein the heater further comprises electrodes at opposing ends of the heater.

* * * * *